(12) United States Patent
Sun

(10) Patent No.: US 7,145,549 B1
(45) Date of Patent: Dec. 5, 2006

(54) RING POINTING DEVICE

(75) Inventor: Jiming Sun, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 864 days.

(21) Appl. No.: 09/722,996

(22) Filed: Nov. 27, 2000

(51) Int. Cl.
*G09G 5/00* (2006.01)

(52) U.S. Cl. .......................... 345/157; 345/60; 341/35; 341/33; 341/34; 200/5 R

(58) Field of Classification Search ........ 345/156–160, 345/163–166, 168–169, 167; 341/21, 22–23, 341/33–35; 200/5 R, 5 E; 463/37–38
See application file for complete search history.

(56) References Cited

U.S. PATENT DOCUMENTS

| | | | |
|---|---|---|---|
| 4,754,268 A | 6/1988 | Mori | 340/710 |
| 4,905,001 A | 2/1990 | Penner | 341/20 |
| 4,954,817 A * | 9/1990 | Levine | 345/179 |
| 5,453,759 A * | 9/1995 | Seebach | 345/158 |
| 5,481,265 A * | 1/1996 | Russell | 341/22 |
| 5,489,922 A * | 2/1996 | Zloof | 345/156 |
| 5,638,092 A * | 6/1997 | Eng et al. | 345/158 |
| 5,694,153 A | 12/1997 | Aoyagi et al. | 345/161 |
| 5,706,026 A * | 1/1998 | Kent et al. | 345/156 |
| 5,832,296 A * | 11/1998 | Wang et al. | 710/3 |
| 5,854,621 A | 12/1998 | Junod et al. | 345/158 |
| 5,945,981 A | 8/1999 | Paull et al. | 345/180 |
| 6,097,374 A * | 8/2000 | Howard | 345/168 |
| 6,184,863 B1 * | 2/2001 | Sibert et al. | 345/156 |
| 6,297,808 B1 * | 10/2001 | Yang | 345/167 |
| 6,400,353 B1 * | 6/2002 | Ikehara et al. | 345/157 |
| 6,570,556 B1 * | 5/2003 | Liao et al. | 345/161 |

OTHER PUBLICATIONS

"FinRing-CatEye", http://www.e-connet.com/products/finring.asp, 1-3, (2000).
"LPM 560 Micro", http://www.cooperinstruments.com/products/lpm_560.html, 1, (1995).
"RingMouse", A.D.A. WorkLink, http://www.worklink.net/ringmouse.html, 1-5, (Aug. 2000).

* cited by examiner

*Primary Examiner*—Lun-yi Lao
(74) *Attorney, Agent, or Firm*—Schwegman, Lundberg, Woessner & Kluth, P.A.

(57) ABSTRACT

A method, system, apparatus, and program product for moving a pointer on a display screen. A ring capable of being worn by a user contains a sensor unit having multiple sensors. When the user activates one of the sensors, the pointer on the display screen moves in a corresponding direction.

30 Claims, 5 Drawing Sheets

RING POINTING DEVICE

FIELD

This invention relates generally to computer input devices and more particularly to video display pointing devices.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© Intel, Incorporated, 2000. All Rights Reserved.

BACKGROUND

Many modern computers have a graphical user interface where the user operates a pointing device to move a pointer or cursor and manipulate icons on a video display screen. A mouse is the most popular pointing device, but there are others, such as a trackball, touch pad, or joystick. But, as computers have grown smaller, it has become more difficult to use a standard mouse attached to a computing device when space is constrained.

For example, a mouse is not a good option for a notebook or laptop computer, which might be used in situations where there is little or no desktop space to place the mouse, such as on an airplane tray-table in a coach-class seat or balanced on the user's lap. To equip a small computing device with a pointing device, computer manufacturers have developed various solutions, such as the j-key stick, a mini-joystick, or a touch-sensitive pad mounted on the keyboard. But, all of these devices can cause the user to develop repetitive-strain injuries after long periods of usage. Other problems include fatigue, frustration, and awkward hand positions that impact effectiveness in using these pointing devices.

In an attempt to address these problems, ring-like pointing devices have been developed that can be slipped onto the finger of a user. These devices use ultrasound or radio-frequency triangulation to detect the finger position in the air in order to obtain coordinates that emulate a mouse. Using such a device, as the user moves the finger containing the ring through the air, the cursor on the screen moves in correspondence. Unfortunately, this technique requires that the user hang the fingers, hands, or even the arms in the air and make fine hand or finger movements, which can cause fatigue.

Without a better pointing device, users will continue to suffer from repetitive strain injuries, fatigue, frustration, and awkward hand positions that impact effectiveness while using computers.

DESCRIPTION

In the following detailed description of exemplary embodiments of the invention, reference is made to the accompanying drawings (where like numbers represent like elements) that form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

Figure 1:
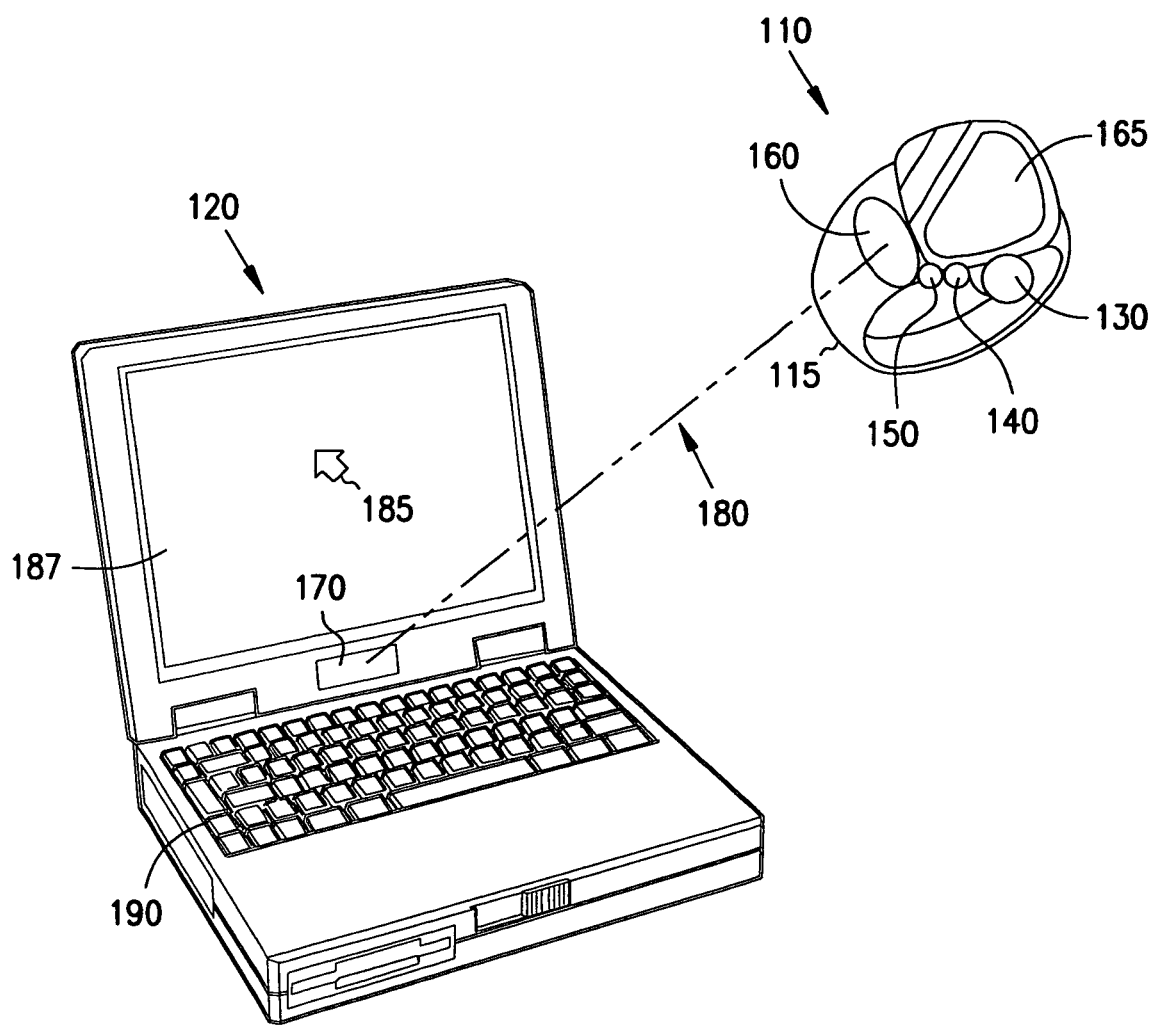
FIG. 1 depicts a pictorial example of a ring pointing device in communication with a computer, according to an embodiment of the invention.

FIG. 1 depicts a pictorial example of a ring pointing device in communication with a computer, according to an embodiment of the invention. Pointing device 110 is shown operating with computer 120. Pointing device 110 is used in conjunction with a graphical user interface (GUI) in which hardware components and software objects are controlled through the selection and the manipulation of associated graphical objects displayed within computer 120.

Computer 120 contains receiver 170, display screen 187, and keyboard 190. Displayed on display screen 187 is pointer 185, which is controlled by the operation of sensor unit 130, as further described below. Computer 120 is further described with reference to FIG. 4.

Pointing device 110 contains ring 115 to which two-dimensional sensor unit 130, right-selection button 140, left-selection button 150, transmitter 160, and ring controller 165 are mounted. Ring 115 is of a size and shape such that it is capable of being worn on a human appendage. In one embodiment, ring 115 is of a size and shape such that it is capable of being worn on a human digit, such as a finger or thumb. But, in other embodiments, ring 115 is of a size and shape such that it can be worn on a wrist or arm. In one embodiment, ring 115 is formed of molded plastic, but any suitable material could be used. By touching sensor unit 130, the user can move pointer 185 in two dimensions across display screen 187 of computer 120. Sensor unit 130 is further described below under the description for FIGS. 3A and 3B.

Right-selection button 140 and left-selection button 150 can be touched by the user to perform selected functions as defined by computer 120. For example, it is typical in computers for a left button touch to select an icon on display screen 187 that pointer 185 is over or adjacent to, but any functions could be defined by computer 120, and the invention is not so limited. Although FIG. 1 shows an embodiment with two selection buttons 140 and 150, in other embodiments any number of buttons could be present. Also, while the embodiment illustrated in FIG. 1 shows buttons 140 and 150 mounted to ring 115, in another embodiment buttons 140 and 150 are mounted to computer 120 in a position accessible by the user's hand.

Ring controller 165 is electrically coupled to sensor unit 130, selection button 140, selection button 150, and transmitter 160. Ring controller 165 operates to translate the signals from sensor unit 130 and selection buttons 140 and 150 into a packet of information, which transmitter 160 sends to receiver 170. In one embodiment, transmitter 160 is an infrared transmitter, receiver 170 is an infrared receiver, and transmitter 160 sends light pulses 180 encoded with packets of information to receiver 170. But in another embodiment, transmitter 160 and receiver 170 employ any wireless technology capable of sending and receiving packets of information, such as radio-frequency technology. Computer 120 will use this packet of information to move pointer 185 based on the activation of sensor unit 130 and perform defined operations based on the activation of selection buttons 140 and 150, as further described below.

In the embodiment shown in FIG. 1, ring controller 165 is separate from transmitter 160, but in another embodiment, they may be packaged together. In the embodiment shown in FIG. 1, ring controller 165 is separate from sensor unit 130, but in another embodiment, they may be packaged together. In one embodiment, ring controller 165 is an integrated circuit composed of logic gates, programmable logic devices, or other hardware components. In another embodiment, ring controller 165 contains memory and a processor that executes instructions residing in the memory. The operation of ring controller 165 is further described with reference to FIG. 5.

Figure 2:
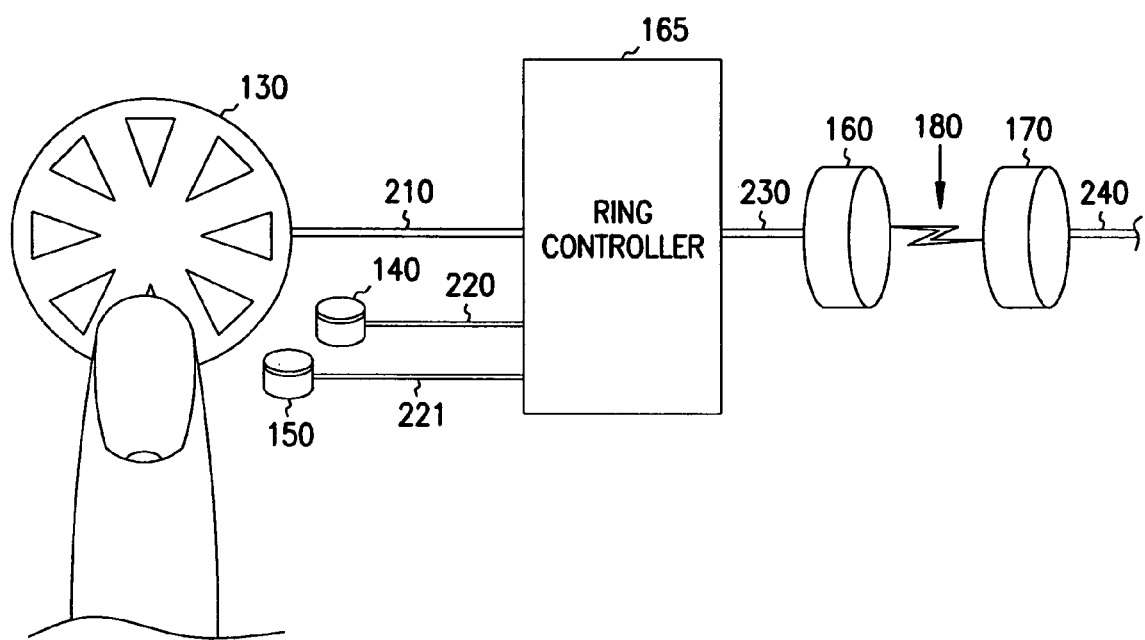
FIG. 2 depicts a block diagram showing more detail of selected elements of the ring pointing device in use with a computer, according to an embodiment of the invention.

FIG. 2 depicts a block diagram showing more detail of selected elements of the ring pointing device in use with a computer, according to an embodiment of the invention. Two-dimensional sensor unit 130 is electrically coupled to ring controller 165 via signal wire 210. Right-selection button 140 is electrically coupled to ring controller 165 via signal wire 220. Left-selection button 150 is electrically coupled to ring controller 165 via signal wire 221. Ring controller 165 is electrically coupled to transmitter 160 via signal wire 230. Infrared transmitter 160 emits light pulses 180 that encode packets of information, which receiver 170 receives. Receiver 170 is electrically coupled to computer 120 via signal wire 240.

Figure 3A:
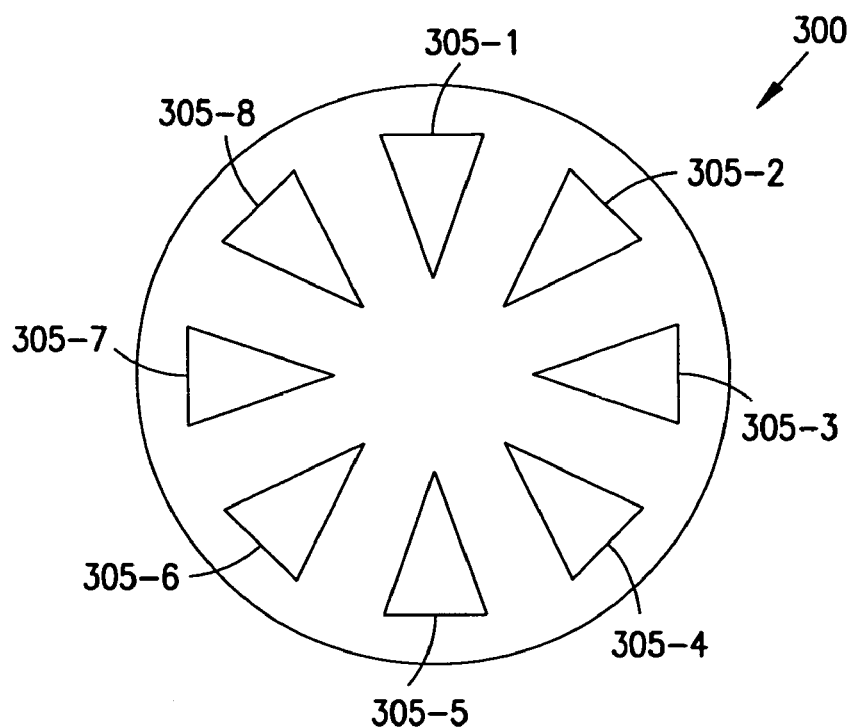
FIG. 3A depicts a top view of a sensor unit that can be used in an embodiment of the invention.

FIG. 3A depicts a top view of sensor unit 130, which can be used in an embodiment of the invention. Sensor unit top 300 contains a plurality of buttons 305-1, 305-2, 305-3, 305-4, 305-5, 305-6, 305-7, and 305-8 arranged in a substantially circular pattern. When the user depresses button 305-1, pointer 185 moves vertically upwards (zero degrees) from its current position on display screen 187. When the user depresses button 305-2, pointer 185 moves upwards and to the right (45 degrees) from its current position on display screen 187. When the user depresses button 305-3, pointer 185 moves horizontally to the right (90 degrees) from its current position on display screen 187. When the user depresses button 305-4, pointer 185 moves downwards and to the right (135 degrees) from its current position on display screen 187. When the user depresses button 305-5, pointer 185 moves vertically downwards (180 degrees) from its current position on display screen 187. When the user depresses button 305-6, pointer 185 moves downwards and to the left (225 degrees) from its current position on display screen 187. When the user depresses button 305-7, pointer 185 moves horizontally leftward (270 degrees) from its current position on display screen 187. When the user depresses button 305-8, pointer 185 moves upwards and to the left (315 degrees) from its current position on display screen 187. In this way, pointer 185 moves in two dimensions on display screen 187 as controlled by the various buttons.

Although eight buttons are shown in the embodiment of FIG. 3A, in other embodiments less or more buttons are present, which operate to move pointer 185 in various directions with less or more granularity on display screen 187.

Figure 3B:
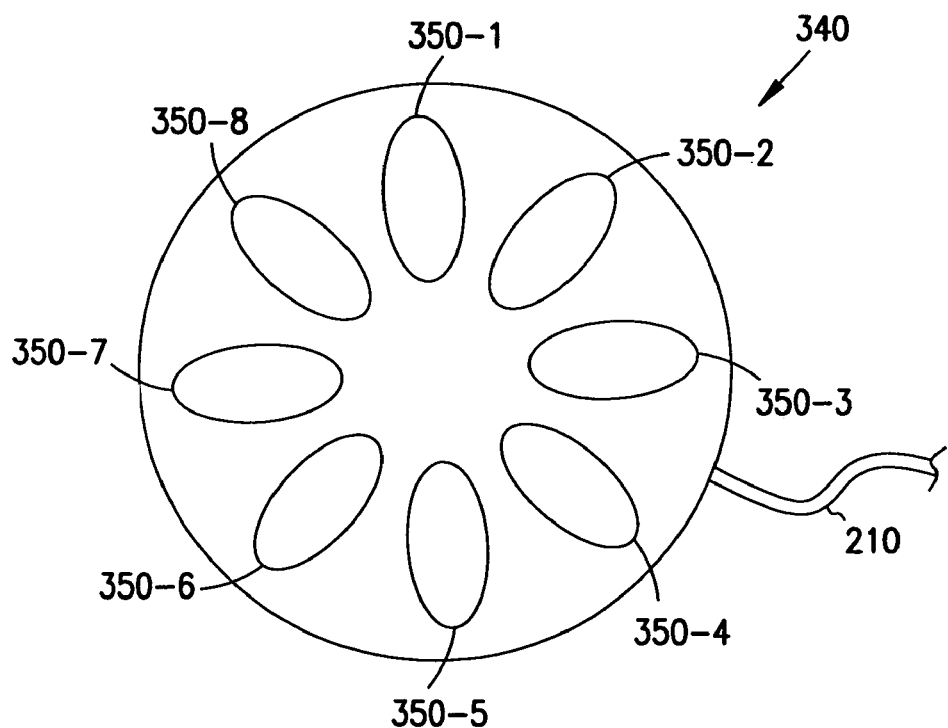
FIG. 3B depicts a bottom view of a sensor unit that can be used in an embodiment of the invention.

FIG. 3B depicts a bottom view of sensor unit 130, which can be used in an embodiment of the invention. Sensor bottom unit 340 contains a plurality of sensors 350-1, 350-2, 350-3, 350-4, 350-5, 350-6, 350-7, and 350-8, which are positioned underneath respective buttons 305-1, 305-2, 305-3, 305-4, 305-5, 305-6, 305-7, and 305-8. When the user depresses one of the buttons, the corresponding sensor is activated, which sends a signal across wire 210 to ring controller 165, as further described with reference to FIG. 5. In one embodiment, the signal indicates which sensor was activated and for how long a time period the sensor was activated. In another embodiment, the signal only indicates which sensor was activated.

In one embodiment, the sensors within sensor element 130 are force sensors, which are activated by the buttons exerting pressure on the force sensors. In other embodiments, rocker switches, capacitive-proximity sensors, inductive-proximity sensors, and photoelectric-proximity sensors may be used.

Figure 4:
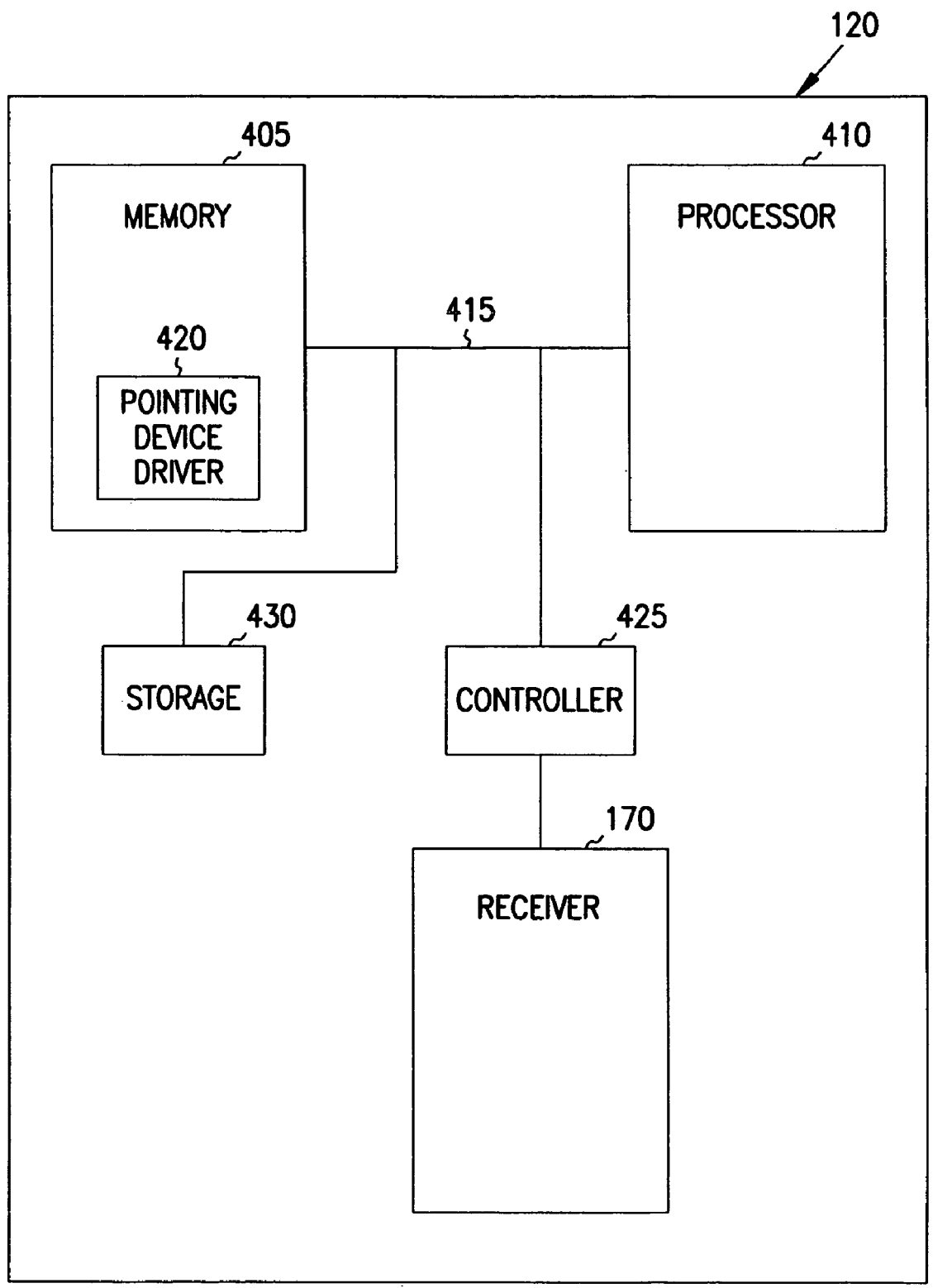
FIG. 4 depicts a block diagram of a computer that can be used in an embodiment of the invention.

FIG. 4 depicts a block diagram of a computer system that can be used in an embodiment of the invention. Computer system 120 contains memory 405, processor 410, controller 425, and storage 430, which are all coupled via bus 415. Computer 120 further contains receiver 170, which is coupled to controller 425. Although the various components of FIG. 4 are drawn as single entities, each may consist of multiple entities and may exist at multiple levels.

Memory 405 comprises a number of individual, volatile-memory modules that store segments of operating system and application software while power is supplied to computer 120. The software segments are partitioned into one or more virtual memory pages that each contains a uniform number of virtual memory addresses. When the execution of software requires more pages of virtual memory than can be stored within memory 405, pages that are not currently needed are swapped with the required pages, which are stored within non-volatile storage 430. Memory 405 is a type of memory designed such that the location of data stored in it is independent of the content. Also, any location in memory 405 can be accessed directly without needing to start from the beginning.

Memory 405 contains pointing-device driver 420, which contains instructions capable of being executed by processor 410. In the alternative, pointing-device driver 420 is implemented by control circuitry though the use of logic gates, programmable logic devices, or other hardware components. Pointing device driver 420 receives information from pointing devices, such as ring pointing device 110 via controller 425, and moves pointer 185 on display 187 in response to this information. In one embodiment, pointing device driver 420 responds to interrupts that contain packets of positional information about the pointing device, deletes the pointer at the current location on display 187, writes the old screen contents at this location, reads and saves the screen contents at the new location, and overwrites the new location with the pointer.

Processor 410 executes instructions and includes that portion of computer 120 that controls the operation of the entire computer system, including executing the arithmetical and logical functions contained in a particular computer program. Although not depicted in FIG. 4, processor 410 typically contains a control unit that organizes data and program storage in a computer memory and transfers data and other information between the various part of the computer system. Processor 410 accesses data and instructions from and stores data to memory 405.

Any appropriate processor could be utilized for processor 410. Although computer 120 is shown to contain only a single processor and a single system bus, the present invention applies equally to computer systems that have multiple processors and to computer system that have multiple buses that each performs different functions in different ways.

In one embodiment receiver 170 receives light pulses 180 from transmitter 160 and transmits the information packets encoded in the light pulses to controller 425. In another embodiment, receiver 170 receives radio waves from transmitter 160 and transmits the information packets encoded in the radio waves to controller 425. Controller 425 converts the information to a format compatible with pointing-device controller 420. In one embodiment, controller 425 issues an interrupt that pointing-device controller 420 processes. Although controller 425 and pointing-device driver 420 are drawn as being separate, in another embodiment, they are packaged together. In one embodiment controller 425 is composed of hardware, but in another embodiment controller 425 contains executable instructions stored in memory 405.

Storage 430 can be implemented as a diskette drive, hard-disk drive, tape drive, CD-ROM, or any other non-volatile storage device. Although storage 430 is shown as being part of computer 120, in another embodiment, it may be external to computer 120, either connected directly, on a network, or attached to a remote computer.

The hardware depicted in FIG. 4 may vary for specific applications. For example, in other embodiments other peripheral devices such as optical-disk media, audio adapters, or chip programming devices, such as PAL or EPROM programming devices are used in addition to or in place of the hardware already depicted.

Computer 120 can be implemented using any suitable computer such as a Macintosh or IBM-compatible personal computer available from a number of vendors. But, an embodiment of the present invention can apply to any hardware configuration that allows manipulation of a pointer on a screen, regardless of whether the computer is a complicated, multi-user computer apparatus, a single-user workstation, a laptop or notebook computer, or a network appliance that does not have non-volatile storage of its own.

As described in detail below, aspects of an embodiment pertain to a method implementable on a computer. In another embodiment, the invention can be implemented as a computer program product for use with a computer. The programs defining the functions of the embodiment can be delivered via a variety of signal-bearing media, which include, but are not limited to:

(1) information permanently stored on non-writeable storage media (e.g., read-only memory devices within a computer such as CD-ROM disks);

(2) alterable information stored on writeable storage media (e.g., storage 430); or (3) information conveyed to a computer by a communications media, such as through a computer or telephone network, including wireless communications.

Such signal-bearing media, when carrying computer-readable instructions that direct the functions of the present invention, represent embodiments of the present invention.

Figure 5:
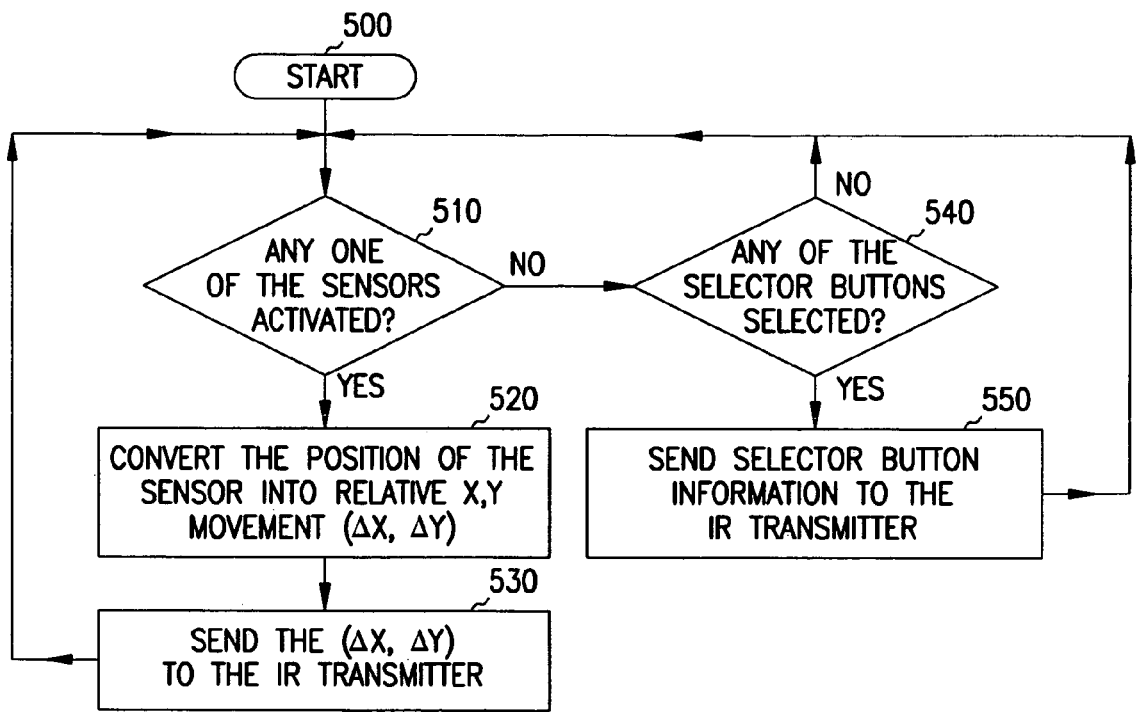
FIGS. 5 and 6 depict flowcharts that illustrate methods for carrying out an embodiment of the invention.

FIG. 5 depicts a flowchart that illustrates a method for carrying out an embodiment of the invention on ring pointing device 110. Control begins at block 500. Control then continues to block 510 where ring controller 165 determines whether any of the sensors in sensor element 130 have been activated. If the determination at block 510 is true, then control continues to block 520 where ring controller 165 determines which sensor in sensor element 130 was activated and for what period of time. In another embodiment, ring controller 165 only determines which sensor was activated. Ring controller 165 then converts this sensor information into a relative movement along the X and Y axes in a Cartesian coordinate system corresponding to display screen 187. In one embodiment, the length of the relative movement that ring controller 165 determines may be directly proportional to the length of time that the sensor is activated. Thus, to move pointer 185 a longer distance, the user depresses a button on sensor element 130 a longer time.

Control then continues to block 530 where ring controller 165 sends the relative movement information to transmitter 160 for transmission. Control then returns to block 510, as previously described above.

If the determination at block 510 is false, then control continues to block 540 where ring controller 165 determines whether one of selection buttons 140 or 150 has been activated. If the determination at block 540 is true, control continues to block 550 where ring controller 165 sends an identification of the selection button activated to transmitter 160 for transmission. Control then returns to block 510, as previously described above. If the determination at block 540 is false, control returns to block 510, as previously described above.

Figure 6:
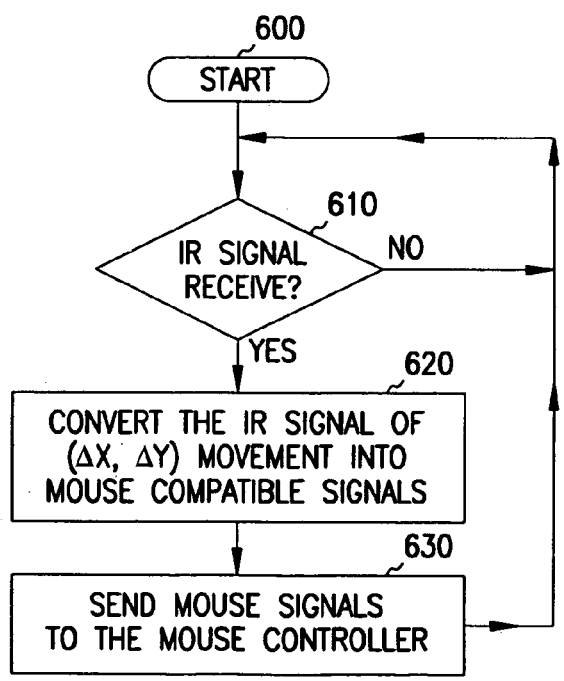

FIG. 6 depicts a flowchart that illustrates a method for carrying out an embodiment of the invention on computer 120. Control begins at block 600. Control then continues to block 610 where controller 425 determines whether a signal has been received by receiver 170. If the determination at block 610 is true, then control continues to block 620 where controller 425 converts the information in the signal into information compatible with pointing-device driver 420 and sends the information to pointing-device driver 420. Control then returns to block 610, as previously described above.

If the determination at block 610 is false, then control returns to block 610, as previously described above.

What is claimed is:

1. A pointing device for controlling a pointer displayed on a display screen, comprising:
    a ring;
    a sensor unit comprising a plurality of sensors in a substantially circular pattern, wherein the sensor unit is mounted on the ring, and wherein each of the plurality of sensors can be activated for positioning the pointer on the display screen; and
    a controller adapted to create position information based on activation of one or more of the plurality of sensors.

2. The pointing device of claim 1, wherein the ring is of a size that is capable of being worn on a human digit.

3. The pointing device of claim 1, further comprising:
    at least one selection button mounted on the ring.

4. The pointing device of claim 1, wherein the at least one selection button is capable of being operated by a human thumb.

5. The pointing device of claim 1, wherein the sensor unit is capable of being operated by a human thumb.

6. The pointing device of claim 1, further comprising:
    a transmitter mounted to the ring, wherein the transmitter is coupled to the controller, and wherein the controller is coupled to the sensor unit, and wherein the controller is to translate a signal from the sensor unit to the position information, and wherein the transmitter is to transmit the position information.

7. The pointing device of claim 6, wherein the movement information contains relative position information regarding the pointer displayed on the display screen.

8. The pointing device of claim 6, wherein the transmitter comprises an infrared transmitter to transmit light pulses encoding the movement information.

9. The pointing device of claim 1, wherein the plurality of sensors comprises pressure sensors.

10. The pointing device of claim 1, wherein the plurality of sensors comprises rocker switches.

11. The pointing device of claim 1, wherein the plurality of sensors comprises capacitance proximity sensors.

12. The pointing device of claim 1, wherein the plurality of sensors comprises inductive proximity sensors.

13. A method for moving a pointer on a display, comprising:
    detecting activation of one of a plurality of sensors arranged in a substantially circular pattern on a sensor unit, wherein the sensor unit is mounted on a ring, and wherein each of the plurality of sensors can be activated for moving the pointer on the display; and
    creating position information for the pointer based on which one of the plurality of sensors was activated.

14. The method of claim 13, wherein the ring is of a size capable of being worn on a human finger.

15. The method of claim 13, wherein the sensor unit is capable of being operated by a human thumb.

16. The method of claim 13, further comprising:
    transmitting the position information.

17. The method of claim 13, wherein the position information contains relative position information regarding the pointer on the display.

18. A computer system, comprising:
    a receiver; and
    a pointing device, comprising,
        a ring;
        a sensor unit mounted to the ring, wherein the sensor unit comprises a plurality of sensors in a substantially circular pattern, and wherein each of the plurality of sensors receives input for moving a pointer on a display screen;
        a controller mounted on the ring, wherein the controller is coupled to the sensor unit; and
        a transmitter mounted to the ring, wherein the transmitter is coupled to the controller, and wherein the controller is to translate a signal from the sensor unit into movement information, and wherein the transmitter is to transmit the movement information to the receiver.

19. The computer system of claim 18, wherein the ring is of a size that is capable of being worn on a human finger.

20. The computer system of claim 18, further comprising:
    at least one selection button mounted on the ring.

21. The computer system of claim 18, wherein the movement information contains relative position information regarding the pointer on the display.

22. The computer system of claim 18, wherein the plurality of sensors comprises pressure sensors.

23. The computer system of claim 18, wherein the plurality of sensors comprises rocker switches.

24. The computer system of claim 18, wherein the plurality of sensors comprises capacitance proximity sensors.

25. The computer system of claim 18, wherein the plurality of sensors comprises inductive proximity sensors.

26. The computer system of claim 18, wherein the transmitter comprises an infrared transmitter that transmits light pulses containing the movement information.

27. A program product comprising signal-bearing media bearing instructions, which when read and executed by a processor perform operations comprising:
    detecting activation of one of a plurality of sensors arranged in a substantially circular pattern on a sensor unit, wherein the sensor unit is mounted on a ring, and wherein each of the plurality of sensors receives input for moving a pointer on a display screen; and
    creating position information for the pointer on the display screen based on which one of the plurality of sensors was activated.

28. The program product of claim 27, wherein the ring is of a size capable of being worn on a human finger.

29. The program product of claim 27, further comprising:
    transmitting the position information from an infrared transmitter.

30. The program product of claim 27, wherein the position information contains relative position information regarding the pointer on the display.

* * * * *